J. R. BUTTWEILER.
DISK SHARPENER.
APPLICATION FILED JUNE 19, 1911.
1,008,695.
Patented Nov. 14, 1911.
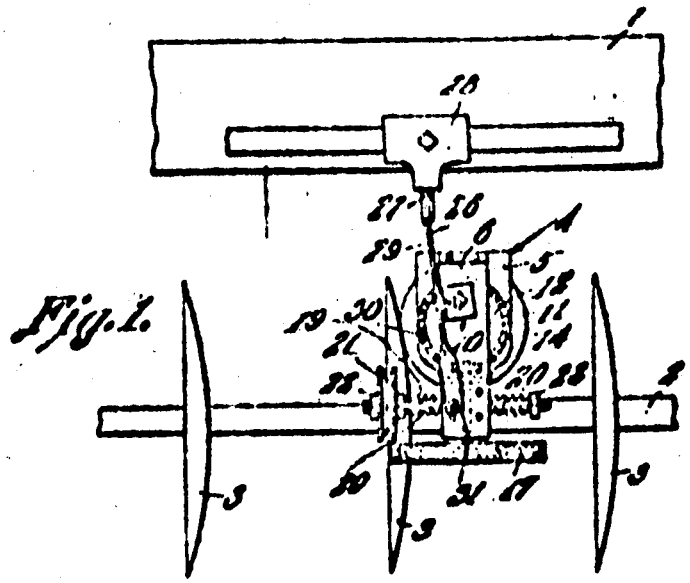
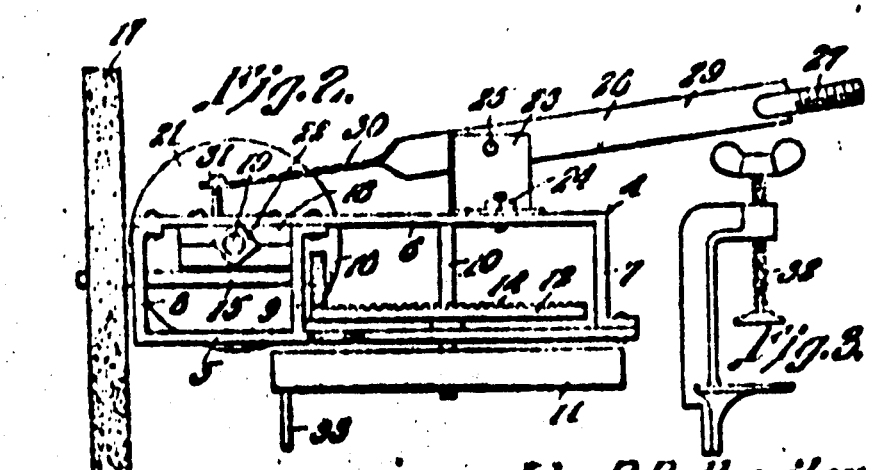
John R. Buttweiler,
Inventor 1,008,695. DISK-SHARPENER. JOHN R. BUTTWEILER, Freeport, Minn., assignor of one-half to Herman Schoener, Freeport, Minn. Filed June 29, 1911. Serial No. 636,106.

*To all whom it may concern:*

Be it known that I, JOHN R. BUTTWEILER, a citizen of the United States, residing at Freeport, in the county of Stearns and State of Minnesota, have invented a new and useful Disk-Sharpener, of which the following is a specification.

The device forming the subject matter of this application, is a disk sharpener, adapted to be assembled with the frame of a disk-carrying agricultural implement, to sharpen the disk, while the implement is in use.

It is the object of the invention to provide a mechanism in which a rotatable drive member, engaging the rotating disk, will constitute a means for operating an abrading member, which abrading member, in its turn, will engage the disk to sharpen the same.

A further object of the invention is to provide novel means for maintaining the abrading member and the drive member in operative relation with respect to the disk which is being sharpened.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a fragmental top plan of an agricultural implement, showing the device of my invention applied thereto, for the purpose of sharpening disks of such implement; Fig. 2 is a side elevation of the disk sharpener; and Fig. 3 is a side elevation of an auxiliary bracket, which may be assembled with the disk sharpener.

In the drawings, the numeral 1 denotes generally, a portion of the frame of an agricultural implement, whereof the numeral 2 indicates the disk shaft, the shaft 2 carrying the disks 3. The construction above referred to is common and well known, and merits no further description.

In carrying out the invention there is provided as a primary and fundamental element, a frame 4, which may be of any form. Preferably, however, as shown, the frame 4 consists of a bottom plate 5, and a top plate 6, connected by end walls 7 and 8, and by an intermediate wall 9. Journaled for rotation in the top plate 6 and in the bottom plate 5, is a drive shaft 10, carrying a drive wheel 11. The drive wheel 11 is located upon the outside of the frame 4, the shaft 10 carrying, within the contour of the frame 4, another wheel 12, the inner lateral face of which is provided with a rack 14.

Journaled for rotation in the end wall 8, and in the intermediate wall 9, is an auxiliary shaft 15, disposed substantially at right angles to the shaft 10. Upon one end, the auxiliary shaft 15 is equipped with a pinion 16, adapted to mesh into the rack 14 of the wheel 12. At its outer end, the shaft 15 carries an abrading member, the same taking the form of a grinding wheel 17. The wheels 11 and 17 are located in planes which are approximately at right angles to each other.

Carried by the frame 4, and preferably located within the contour of the same, between the walls 8 and 9, and relatively near to the wall 9, are bearings 18, in which is mounted for rotation, and for longitudinal sliding movement, a shaft 19. The shaft 19 is surrounded, adjacent its ends, by compression springs 20, adapted to bear against opposite sides of the bearings 18. At its outer end, the shaft 19 carries a grooved wheel 21 which, if desired, may be mounted for rotation upon the shaft. Adjacent its opposite end, the shaft 19 is equipped with a nut 22, the function of which is to adjust the tension of the springs 20.

An angle bracket 23 is applied to the upper face of the frame 4, and is held in place thereon by a bolt 24, or in any other desired manner. Fulcrumed intermediate its ends upon the bracket 23, as shown at 25, is a spring arm 26, extended longitudinally of the frame 4. The spring arm 26 is adapted for connection with the implement of which the disk 3 constitutes a part, and the manner of connecting the arm 26 with the implement, may be varied greatly, without departing in any wise from the spirit of the invention, and obviously, since the device is adapted to be assembled with machines differing greatly in construction, the parts whereby the device is assembled with such machine, will be subject to many changes. If desired, the rear end of the arm 26 may be threaded as shown at 27, to engage with a head 28, adapted to be clamped upon any suitable portion of the frame 1 of the implement.

The arm 26 consists of a resilient portion 29, and a resilient portion 30, the portion 29 being yieldable horizontally, when the device is in use, and the portion 30 being yieldable vertically. Threaded into the end of the portion 30, is a screw 31, adapted to engage the frame 4.

In practical operation, the disk sharpener is assembled with the frame 1, as shown in Fig. 1. Under such circumstances, the drive wheel 11 will engage with the disk 3, and the grinding wheel 17 will also engage with the disk 3, adjacent its periphery, and in a direction approximately radial with respect to the disk. The grooved wheel 21 will engage with the periphery of the disk 3, and constitute a means for holding the grinding wheel 17 against lateral displacement, in a horizontal direction, from the disk 3. The spring portion 30 of the arm 26 will exert a downward pressure upon the frame 4, and thus the grinding wheel 17 will be held against the disk 3, against upward displacement, vertically. The spring portion 29 of the arm 26 will exert a lateral thrust against the frame 4, holding the drive wheel 11 in operative relation with respect to the disk 3. Obviously, by moving the nut 22 upon the shaft 19, the tension of the springs 20 may be adjusted. Also, by rotating the screw 31, the tension of the portion 30 of the spring arm 26 may be adjusted.

From the foregoing it will be seen that when the disk 3 rotates, the same will impart a rotation to the drive wheel 3, the drive wheel 3 actuating the drive shaft 10, the wheel 12 of which, meshing into the wheel 16, will actuate the auxiliary shaft 15, the auxiliary shaft 15, in its turn, serving to rotate the grinding wheel 17.

If desired, a simple clamp of the type shown in Fig. 3, and denoted by the numeral 32, may be provided. If desired, the angle bracket 23 may be removed from the frame 4, the frame 4 being secured to the clamp 32, the device, under such circumstances, being adapted to be employed upon a bench, or other support, for the sharpening of tools. To facilitate this operation, the drive wheel 11 may, if desired, be provided with a suitable operating handle 33 of any construction.

Having thus described the invention, what is claimed is:—

1. A device of the class described comprising a frame; a rotatable driving member journaled therein and adapted to bear directly against the disk to be sharpened and to be independently rotated by engagement with the disk; a rotatable abrading member journaled in the frame and adapted to engage the disk, to sharpen the same; means for operatively connecting the drive member and the abrading member; and means for securing the frame to the implement of which the disk constitutes a part.

2. A device of the class described comprising a frame; a rotatable drive member journaled therein and adapted to bear directly against the disk to be sharpened and to be independently rotated by engagement with the disk; a rotatable abrading member journaled in the frame and adapted to engage the disk to sharpen the same; means for operatively connecting the drive member and the abrading member; yieldable means upon the frame for engaging the periphery of the disk to hold the abrading member thereagainst; and means for securing the frame to the implement of which the disk constitutes a part.

3. A device of the class described comprising a frame; a rotatable drive member journaled therein and adapted to engage the disk to be sharpened; a rotatable abrading member journaled in the frame and adapted to engage the disk to sharpen the same; means for operatively connecting the drive member and the abrading member; a shaft mounted for longitudinal sliding movement in the frame, and having a portion adapted to engage the periphery of the disk, to hold the abrading member thereagainst; and spring means for limiting the sliding movement of the shaft; and means for securing the frame to the implement of which the disk constitutes a part.

4. A device of the class described comprising a frame; a rotatable drive member journaled therein and adapted to engage the disk to be sharpened; a rotatable abrading member journaled in the frame and adapted to engage the disk to sharpen the same; means for operatively connecting the drive member and the abrading member; a shaft journaled for rotation in the frame, and longitudinally slidable therein, the shaft having an element adapted to engage the periphery of the disk, to hold the abrading member thereagainst; compression springs upon the shaft, bearing against opposite portions of the frame; means upon the shaft for adjusting the tension of the springs; and means for securing the frame to the implement of which the disk constitutes a part.

5. A device of the class described comprising a frame; a rotatable drive member journaled therein and adapted to bear directly against the disk to be sharpened and to be independently rotated by engagement with the disk; a rotatable abrading member journaled in the frame and adapted to engage the disk to sharpen the same; means for operatively connecting the drive member and the abrading member; a spring arm connected with the frame and adapted to hold the rotatable member against the disk; and means for securing the arm to the implement of which the disk constitutes a part.

6. A device of the class described comprising a frame; a rotatable drive member journaled therein and adapted to engage the disk to be sharpened; a rotatable abrading member journaled in the frame and adapted to engage the disk to sharpen the same; means for operatively connecting the drive member and the abrading member; yieldably supported means, slidable and rotatable in the frame, and adapted to engage the periphery of the disk, to hold the abrading member thereagainst; a spring arm fulcrumed upon the frame; means for securing the arm to the implement of which the disk constitutes a part; and means for adjusting the tension of the arm.

7. A device of the class described comprising a frame; a rotatable drive member journaled therein and adapted to engage the disk to be sharpened; a rotatable abrading member journaled in the frame and adapted to engage the disk to sharpen the same;

means for operatively connecting the drive member and the abrading member; a spring arm fulcrumed intermediate its ends upon the frame, and yieldable in angularly disposed directions, the arm, when yielding in one direction, serving to thrust the driving member against the disk, the arm when yielding in the other direction, serving to press the abrading member against the disk; and means for securing the arm to the implement of which the disk constitutes a part.

8. A device of the class described comprising a frame; a rotatable drive member journaled therein and adapted to engage the disk to be sharpened; a rotatable abrading member journaled in the frame and adapted to engage the disk to sharpen the same; means for operatively connecting the drive member and the abrading member; means yieldably supported for rotation and for sliding movement in the frame, and adapted to engage the disk, to hold the abrading member against the same; a spring arm fulcrumed intermediate its ends upon the frame, and yieldable in angularly disposed directions, the arm, when yielding in one direction, constituting a means for holding the drive member against the disk, the arm when yielding in the other direction, constituting a means for holding the abrading member against the disk; means for connecting one end of the arm with the implement of which the disk constitutes a part; and means engaging the other end of the arm and the frame, to adjust the tension of the arm.

In testimony that I claim the foregoing as my own, I have hereto affixed my signature in the presence of two witnesses.

JOHN R. BUTTWEILER.

Witnesses:
P. F. BENOLKER,
JOHN W. KUHN.